US 12,407,590 B1

United States Patent
Ainsworth et al.

(10) Patent No.: US 12,407,590 B1
(45) Date of Patent: Sep. 2, 2025

(54) ABANDONED MACHINES

(71) Applicant: Progress Software Corporation, Burlington, MA (US)

(72) Inventors: John Ainsworth, Burlington, MA (US); Pavel Minarik, Burlington, MA (US); Jiri Knapek, Burlington, MA (US)

(73) Assignee: Progress Software Corporation, Burlington, MA (US)

( * ) Notice: Subject to any disclaimer, the term of this patent is extended or adjusted under 35 U.S.C. 154(b) by 0 days.

(21) Appl. No.: 18/522,014

(22) Filed: Nov. 28, 2023

(51) Int. Cl.
*H04L 43/065* (2022.01)
*H04L 43/02* (2022.01)

(52) U.S. Cl.
CPC ............ *H04L 43/065* (2013.01); *H04L 43/02* (2013.01)

(58) Field of Classification Search
None
See application file for complete search history.

(56) References Cited

U.S. PATENT DOCUMENTS

| | | | |
|---|---|---|---|
| 2015/0271192 A1* | 9/2015 | Crowley | H04L 41/149 726/22 |
| 2017/0147372 A1* | 5/2017 | Cudak | G06F 9/45558 |
| 2017/0359246 A1* | 12/2017 | Bodas | H04L 67/10 |
| 2020/0028871 A1* | 1/2020 | Thayer | H04L 63/1466 |
| 2020/0379529 A1* | 12/2020 | Le Goff | G06F 1/206 |
| 2022/0263725 A1* | 8/2022 | Mayer Zu Eissen | H04L 41/147 |
| 2023/0143232 A1* | 5/2023 | Balazs | H04L 63/1466 709/223 |
| 2023/0164043 A1* | 5/2023 | Sirov | H04L 41/5032 709/224 |

* cited by examiner

*Primary Examiner* — Joshua Joo
(74) *Attorney, Agent, or Firm* — PATENT LAW WORKS LLP (57) ABSTRACT

A system and method for obtaining, using one or more processors, network telemetry data; identifying, using the one or more processors, a set of active machines based on network telemetry data; analyzing, using the one or more processors, traffic associated with the set of active machines; determining, using the one or more processors, one or more abandoned machines in the set of active machines; and outputting, using the one or more processors, an identification of the one or more abandoned machines.

20 Claims, 4 Drawing Sheets

ABANDONED MACHINES

FIELD OF INVENTION

The present disclosure relates to identification of one or more active but abandoned machines.

BACKGROUND

It is not uncommon for a user to deploy a machine (virtual or physical), use it for a period, and then abandon (i.e., cease using) that machine without shutting or deactivating that machine.

SUMMARY

In general, an innovative aspect of the subject matter described in this disclosure may be embodied in methods that include: obtaining, using one or more processors, network telemetry data; identifying, using the one or more processors, a set of active machines based on network telemetry data; analyzing, using the one or more processors, network telemetry data associated with the set of active machines; determining, using the one or more processors, one or more abandoned machines in the set of active machines; and outputting, using the one or more processors, an identification of the one or more abandoned machines.

According to another innovative aspect of the subject matter described in this disclosure, a method to: obtain network telemetry data; identify a set of active machines based on network telemetry data; analyze the network telemetry data associated with the set of active machines; determining one or more abandoned machines in the set of active machines; and output an identification of the one or more abandoned machines.

Other implementations of one or more of these aspects include corresponding systems, apparatus, and computer programs, configured to perform the actions of the methods, encoded on computer storage devices. These and other implementations may each optionally include one or more of the following features.

For instance, the features further include generating a set of machines to monitor for abandonment based on a set of machines known to a network traffic monitor, wherein the network telemetry data obtained is a subset of available network telemetry data available and is that network telemetry data that is associated with the set of machines to monitor for abandonment. For instance, the features further include determining a set of monitored machines, the set of monitored machines being monitored by a network traffic monitor that generates the network telemetry data, and the set of monitored machines is further being monitored for abandonment, wherein the network telemetry data obtained describes the set of one or more monitored machines and includes the set of active machines. For instance, the features further include that the set of monitored machines is identified by an identifier in the network telemetry data, wherein the identifier includes one or more of a range of a MAC addresses, a range of IP addresses, a list of MAC addresses, a list of IP addresses, a universal unique identifier of a virtual machine, and an interface ID of network adapter. For instance, the features further include analyzing the network telemetry data associated with the set of active machines determining whether the network telemetry data includes one or more of a first characteristic associated with an active but unabandoned machine and a second characteristic associated with an abandoned machine. For instance, the features further include that the second characteristic associated with an abandoned machine is associated with one or more of a port number associated with traffic and a periodicity of the traffic, the traffic described by the network telemetry data. For instance, the features further include that determining the one or more abandoned machines in the set of active machines includes: analyzing the network telemetry data; determining that the network telemetry data associated with a first machine is uncharacteristic of human use; and identifying the first machine as one of the one or more abandoned machines. For instance, the features further include that the set of active machines includes one or more of a virtual machine and a physical machine. For instance, the features further include deactivating a first abandoned machine in the one or more identified, abandoned machines, wherein the deactivation is one of: automatic and based on the identification of the first abandoned machine as abandoned, or based on the identification of the first abandoned machine as abandoned and responsive to user input requesting abandonment. For instance, the features further include that the identification of the one or more abandoned machines is output in a report presented to a user.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

It is not uncommon for a user to deploy a machine, use it for a period, and then abandon (i.e., cease using) that machine. Abandoned machines, while not being actively used by a user, are still active machines. Accordingly, those abandoned machines use resources and may present security exposures. For example, those abandoned machines may consume one or more of monetary resources (e.g., as an operational or capital expenditure), computation resources (e.g., bandwidth, processor cycles, memory, etc.), and physical resources (e.g., electricity, etc.). As another example, the abandoned machines may negatively impact security exposure, e.g., by providing forgotten tunnels through firewalls or other security mechanisms that may be coopted by a nefarious user. Therefore, it may be beneficial to identify and deactivate abandoned machines. However, identifying abandoned machines is non-trivial. A user that initially deployed the machine and subsequently abandoned the machine may not realize that machine is still active and is likely unable to identify which machine he/she deployed and abandoned even if presented a list of active machines. For example, machines may be spooled up by developers in a development environment and be left abandoned, and the developer may not be aware of which machines he/she spooled up or whether they were deactivated or remain active and abandoned. The systems and methods described herein may beneficially identify abandoned machines, which may, depending on the implementation, be manually and/or automatic deactivated.

Figure 1:
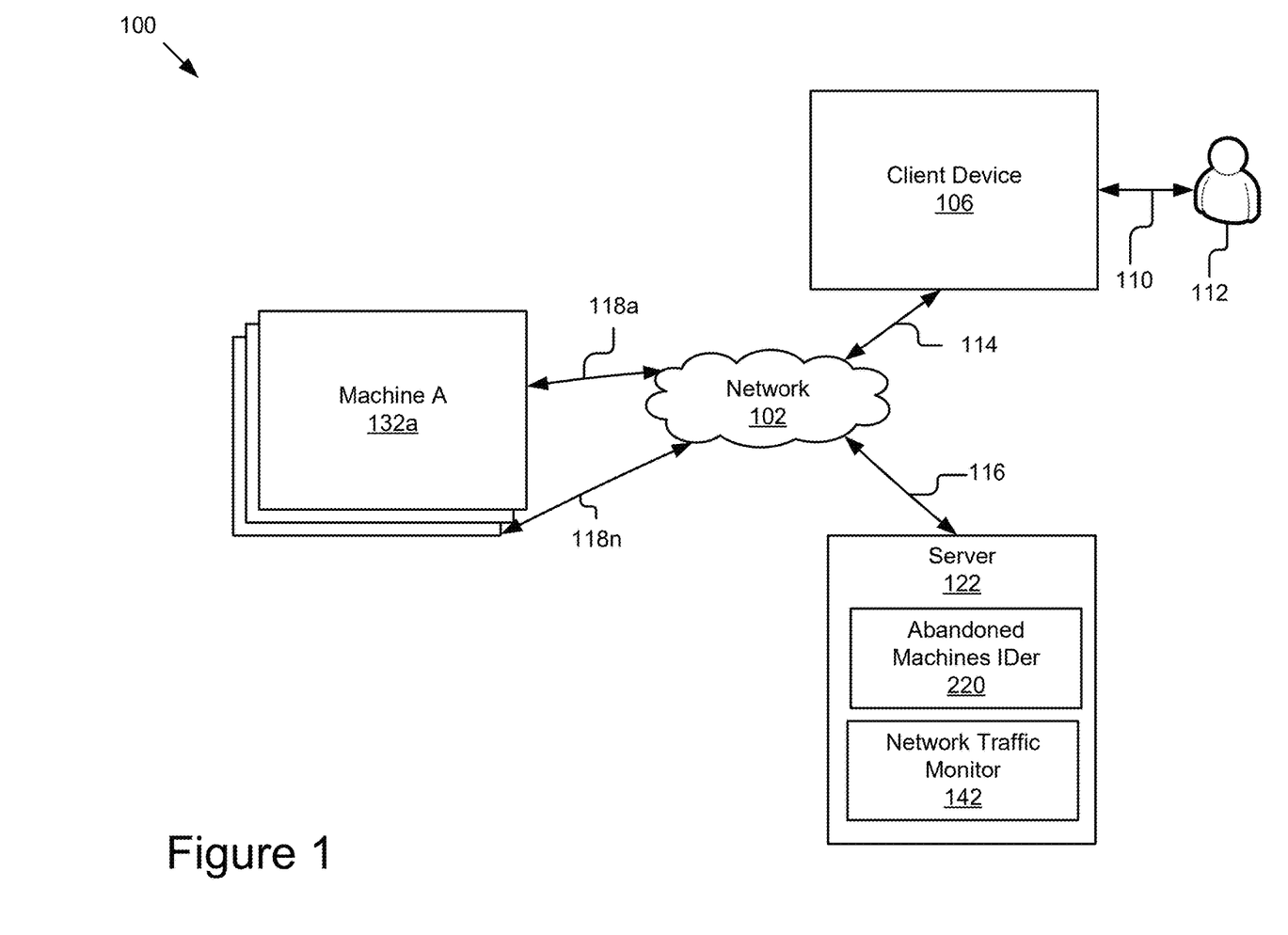
FIG. 1 is a block diagram illustrating an example system for identifying one or more abandoned machines in accordance with some implementations.

FIG. 1 is a block diagram illustrating an example system 100 for identifying one or more abandoned machines according to one implementation. The illustrated system 100 includes a client device 106, one or more machines 132a . . . n, and a server 122, which are communicatively coupled via a network 102 for interaction with one another. For example, the client devices 106 may be coupled to the network 102 via signal line 104 and may be accessed by user 112 as illustrated by line 110. The machines 132a . . . n may be coupled to the network 102 via signal lines 118a . . . n. The server 122 may be coupled to the network 102 via signal line 116. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation (BSON), Comma Separated Values (CSV), etc. In addition, all or some of links can be encrypted using conventional encryption technologies, for example, the secure sockets layer (SSL), Secure HTTP (HTTPS) and/or virtual private networks (VPNs) or Internet Protocol security (IPsec). In another implementation, the entities can use custom and/or dedicated data communications technologies instead of, or in addition to, the ones described above. Depending upon the implementation, the network 102 can also include links to other networks.

The client devices 106 are computing devices having data processing and communication capabilities. While FIG. 1 illustrates one client devices 106, the present specification may apply to any system architecture having one or more client devices 106. In some implementations, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1, the system 100 may include any number of client devices 106. For example, a first user 112 may use a first client device 106 to use a machine 132a and a second user 112b may use a second (not shown) client device 106 to access an identification of the one or more abandoned machines generated by the abandoned machine identifier 220. In addition, the different instances of the client devices 106 may be the same or different types of computing devices.

Depending on the implementation and use case, a client device 106 may present a set of abandoned machines identified by the abandoned machines IDer 220, e.g., in a report. In some implementations, the client device 106 may be used by a developer, e.g., to request and spool up one or more of the machines 132a . . . n which may be potentially become abandoned.

The server 122 may include one or more computing devices having data processing, storing, and communication capabilities. For example, the server 122 may include one or more hardware servers, server arrays, storage devices, systems, etc., and/or may be centralized or distributed/cloud-based. In some implementations, the server 122 may include one or more virtual servers, which operate in a host server environment and access the physical hardware of the host server including, for example, a processor, memory, storage, network interfaces, etc., via an abstraction layer (e.g., a virtual machine manager).

In some implementations, the system 100 includes a plurality of network telemetry traffic monitors (not shown) that generate network telemetry data. For example, while not shown, the network 102 may include network traffic telemetry monitors (not shown) including any of the following (individually or in combination): one or more probes, one or more routers, one or more switches, one or more network device that generate or provide telemetry data, one or more cloud platforms that generate or provide telemetry data, etc.

In some implementations, network telemetry data is collected or aggregated and used by the abandoned machine identifier 220 to identify one or more abandoned machines. In some implementations, the collector, or aggregator, of network telemetry data is referred to herein as the network traffic monitor 142. Examples of a network traffic monitor 142 may include a Progress Software Corporation's Flowmon® collector; however, other examples exist and are within the scope of this disclosure. In one implementation, the server 122 includes an instance of a network traffic monitor 142 and an abandoned machines identifier 220 that uses the network telemetry data generated by the network traffic monitor 142.

The one or more machines 132a . . . 132n may include, or represent, one or more computing devices having data processing, storing, and communication capabilities. For example, the machine(s) 132 may include, or represent, one or more of a physical/hardware server(s), server array(s), storage device(s), systems, appliance(s), etc., or any combination thereof, and/or may be centralized or distributed/cloud-based. In some implementations, the one or more machines 132 may include one or more virtual machines. For example one or more servers, which operate in a host server environment and access the physical hardware of the host server including, for example, a processor, memory, storage, network interfaces, etc., via an abstraction layer (e.g., a virtual machine manager). In some implementations, the one or more machines 132 may include a mixture of machine types including at least one hardware and at least one virtual machines.

It should be understood that the system 100 illustrated in FIG. 1 is representative of an example system for identifying one or more abandoned machines according to one implementation and that a variety of different system environments and configurations are contemplated and are within the scope of the present disclosure. For instance, various functionality may be moved from a server (as illustrated) to a machine or a client, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
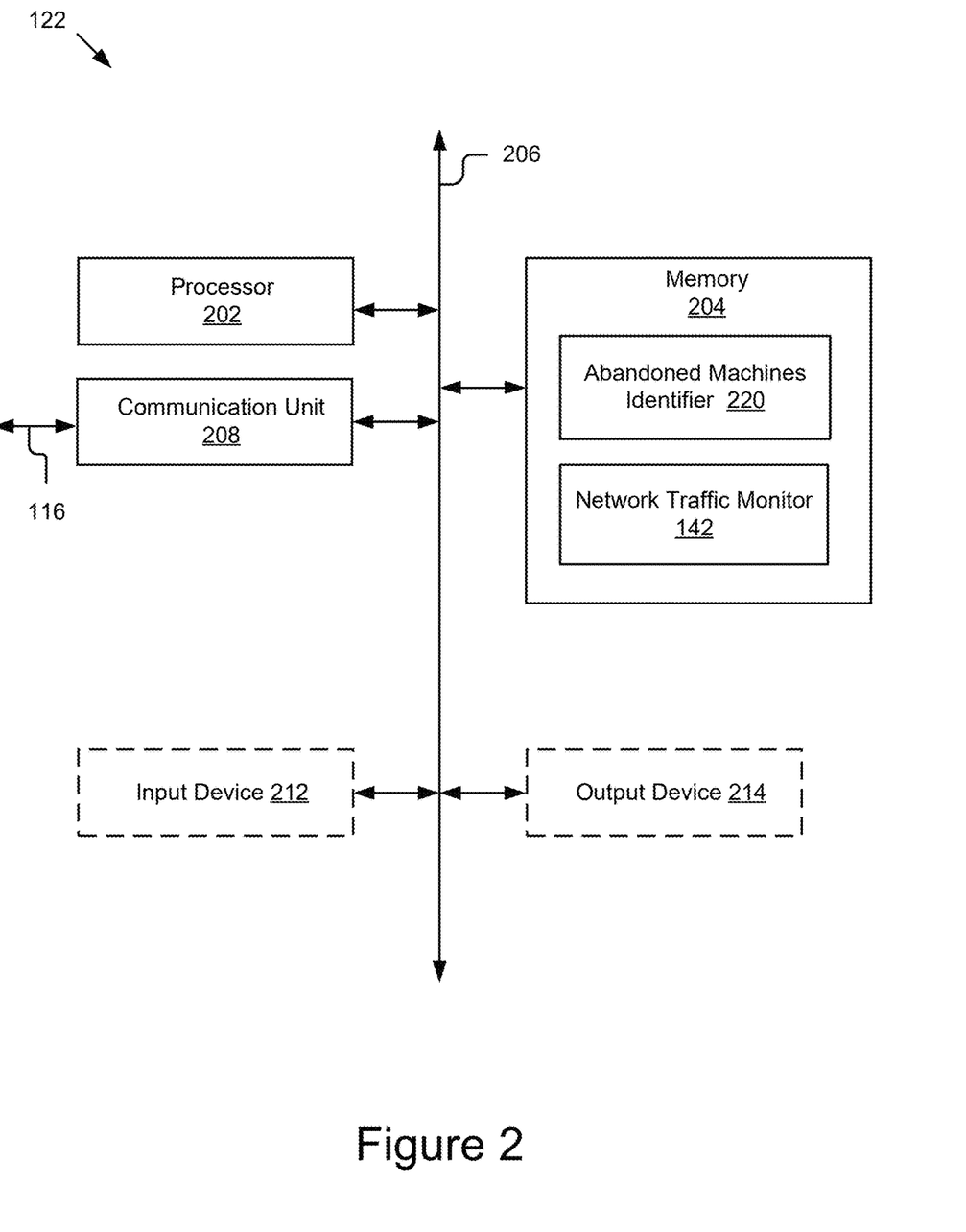
FIG. 2 is a block diagram illustrating an example server in accordance with some implementations.

FIG. 2 is a block diagram of an example server 122 according to one implementation. The server 122, as illustrated, may include a processor 202, a memory 204 and a communication unit 208, which may be communicatively coupled by a communications bus 206. The server 122 depicted in FIG. 2 is provided by way of example and it should be understood that it may take other forms and include additional or fewer components without departing from the scope of the present disclosure. For example, the server 122 may include a storage device, input devices 212 and/or output devices 214 (e.g., a display, a keyboard, a mouse, touch screen, speakers, etc.), various operating systems, sensors, additional processors, and other physical configurations. Additionally, it should be understood that the computer architecture depicted in FIG. 2 and described herein with reference to the server 122 may be applied to other entities in a system 100, for example, a client device 106 or a machine 132.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the server 122 including, for example, the memory 204 and communication unit 208.

The memory 204 may store and provide access to data to the other components of the server 122. In some implementations, the memory 204 may store instructions and/or data that may be executed by the processor 202. For example, in the illustrated implementation, the memory 204 may store one or more of the abandoned machines identifier 220 and the network traffic monitor 142. The memory 204 is also capable of storing other instructions and data, including, for example, an operating system, hardware drivers, other software applications, databases, etc. The memory 204 may be coupled to the bus 206 for communication with the processor 202 and the other components of the server 122. In the illustrated implementation, the memory 204 stores an abandoned machines identifier 220 and a network traffic monitor 142. In one implementation, the network traffic monitor 142 generates telemetry date, which is used by abandoned machines identifier 220 to one or more abandoned machines.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random-access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a server 122 and/or between computing devices (e.g. between one or more of the client device 106 and non-relational database 120), a network bus system including the network 102 or portions thereof, a processor mesh, a combination thereof, etc. In some implementations, the schema tool 109, its sub-components and various other software operating on the computing device 106/122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the server 122 may include other and/or fewer components. Examples of other components may optionally include one or more of an output device 214, an input device 212, a sensor (not shown), etc. In one implementation, the server 122 includes an output device 214 including a display. The display may display electronic images and data for presentation to a user 112. The display may include any display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The optional input device 212 may include any device for inputting information into the server 122. In some implementations, the input device 212 may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Abandoned Machines Identifier 220

Figure 3:
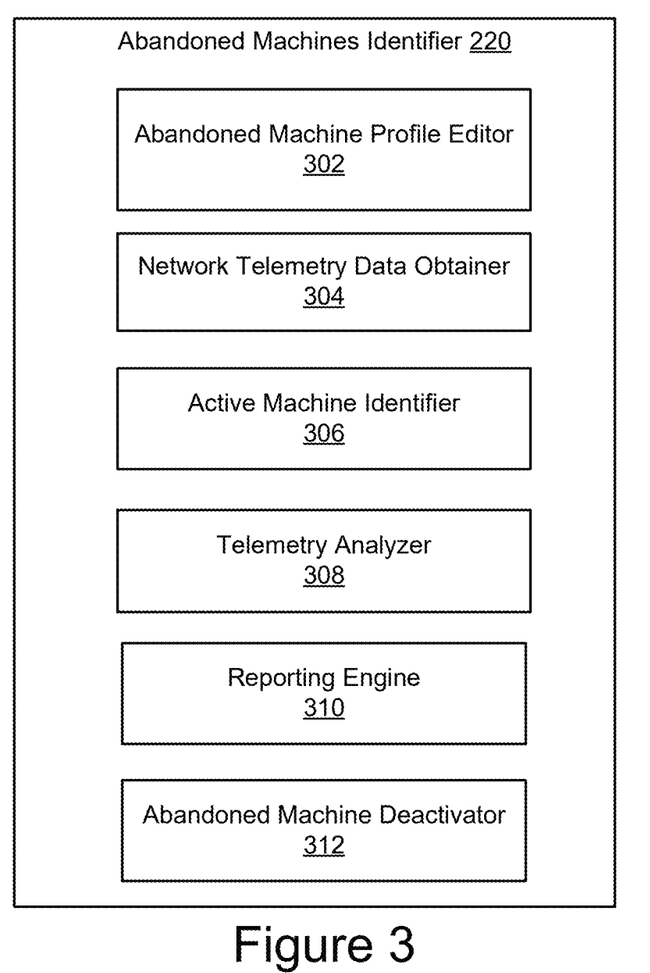
FIG. 3 is a block diagram of an abandoned machines identifier in accordance with some implementations.

Referring now to FIG. 3, the abandoned machines identifier 220 is shown in more detail according to one implementation. The abandoned machines identifier 220 identifies one or more abandoned machines. In one implementation, the abandoned machines identifier 220 comprises an abandoned machine profile editor 302, a network telemetry data obtainer 304, an active machine identifier 306, a telemetry analyzer 308, a reporting engine, and an abandoned machine deactivator 312. It will be recognized that the components 302, 304, 306, 308, 310, and 312 comprised in the abandoned machines identifier 220 are not necessarily all on the same server 122. In one implementation, the components 302, 304, 306, 308, 310, and 312 and/or their functionality are distributed across multiple servers 122.

The abandoned machine profile editor 302 includes code and routines for generating an abandoned machine profile. In one implementation, the abandoned machine profile editor 302 is a set of instructions executable by the processor 202. In another implementation, the abandoned machine profile editor 302 is stored in the memory 204 and is accessible and executable by the processor 202. In either implementation, the abandoned machine profile editor 302 is adapted for cooperation and communication with the processor 202, other components of the server 122 and other components of the abandoned machines identifier 220.

In some implementations, the abandoned machine profile editor 302 generates an abandoned machine profile during a configuration period and the abandoned machine profile is used during runtime by one or more other components 304, 306, 308, 310, 312 of the abandoned machines identifier 220. The configurability of the abandoned machine profile may allow customization to different machine environments. For example, the abandoned machine profile editor 302 may generate a different profile for a developer environment (e.g., to identify abandoned machines used by a team of developers developing an application) than for a production environment (e.g., to identify abandoned machines used by customers/end-users).

In some implementations, an abandoned machine profile includes an identification of a set of monitored machines and a traffic definition. The set of monitored machines identifies one or more machines monitored, by the abandoned machines identifier 220, for abandonment. In some implementations, the set of monitored machines is identified based on identifiers present in the network telemetry data. Depending on the implementation and use case, the identification of the set of monitored, by the abandoned machines identifier 220, machines is based on one or more of an IP address, MAC address, a universally unique identifier (UUID) such as that of a virtual machine, an interface ID of a network adapter, or other identifier. For example, the identification of the set of monitored machines may comprise one or more of a range of MAC addresses, a range of IP addresses, a list of MAC addresses, a list of IP addresses, a range or list of UUIDs of virtual machines, a range or list of interface ID of a network adapters, etc. As another example, the set of monitored machines may include and be identified by an IP subnet such as 192.168.50.0/23.

In some implementations, the identified set of one or more machines, which are monitored by the abandoned machines identifier 220 for abandonment, are also monitored by the network traffic monitor 142. In some implementations, the abandoned machine profile editor 302 may be communicatively coupled to the network traffic monitor 142 to generate a set of suggestions or provide a list of known (to the network traffic monitor 142) machines which may be selected to generate the set of monitored machines.

In some implementations, the set of one or more machines monitored for abandonment, as defined in a particular profile, may be a subset of those machines available to be monitored for abandonment, e.g., the one or more machines may be specific to only those machines used by a set of developers associated with an entity. It should be understood that by generating multiple profiles using the abandoned machine profile editor 302, the systems and methods described herein may provide more accurate identification of abandoned machines (e.g., by better tailoring definitions of abandonment to different sets of machines) and more granular control (e.g., over whether to err on the side of over inclusivity or under inclusivity, or whether to auto-deactivate identified abandoned machines, etc.). For example, the profiles may be defined such that machines associated with the production environment are not automatically deactivated and/or are subject to a more stringent definition of what it means to be abandoned to minimize the risk of interruptions to users (e.g., customers) of the machine, should that machine be inaccurately identified as abandoned.

The traffic definition defines one or more characteristics describing traffic of an active machine and/or an abandoned machine. For example, the traffic definition may include a set of rules including presence of traffic on a particular port number (i.e., a first characteristic that may indicate active status), periodicity of the traffic (i.e., a second characteristic that, if regular, could represent regular system updates rather than active use by a user), a quantity of the traffic (i.e. a third characteristic that if relatively small may be indicative of disuse, particular if periodic, as may be the case with a heartbeat signal or some sort of system polling), a source or destination of the traffic (i.e., a fourth or fifth characteristic that may be indicative of abandonment/disuse, e.g., traffic between the machine owner/operator, such as AWS or its load balancer, vs to a user's client device), etc.

The one or more characteristics in the traffic definition may vary. In some implementations, the one or more characteristics are a subset of the attributes available in network telemetry data obtainable from the network traffic monitor 142. The variety of characteristics and network telemetry data attributes are so varied and numerous as to provide a complete listing. However, it should be recognized that the number and variety of available characteristics provide the systems and methods herein with a great degree of flexibility and granularity to tailor and optimize the traffic definition. For example, to reduce false positives, to reduce false negatives, to reduce the number of characteristics (or network telemetry data attributes) obtained and used to evaluate for abandonment, etc.

In some implementations, the profile may define one or more times. For example, the profile may identify a frequency at which the profile it to be applied by the abandoned machines identifier 220 and submodules thereof for abandonment (e.g., every X seconds, minutes, hours days, weeks, months, years, etc.) to identify whether any machines are abandoned. As another example, the definition may define a time related to the network traffic definition, such as machine is abandoned if the machine has not received management traffic on port 443 or 22 for X days.

Depending on the implementation, the traffic definition may one or more of positively identify an abandoned machine (i.e., the definition describes one or more characteristics that, when met, indicate abandonment of the associate machine), negatively identify an abandoned machine (i.e., the definition describes one or more characteristics of an active and in-use/unabandoned machine, and an abandoned machine fails to satisfy the one or more characteristics), or a combination thereof (e.g., use a first portion of a definition to identify unabandoned, active machines and then apply a second portion of a definition to identify which of the remaining machines are abandoned) based on their associated traffic.

Depending on the implementation, the abandonment machine profile editor 302 may generate an abandoned machine profile using one or more of a variety of mechanisms. In some implementations, an abandoned machine profile may be generated through user input, e.g., via an input device such as a keyboard and/or pointer. In some implementations, the abandoned machine profile editor 302 may generate an abandoned machine profile using one or more of an API, script, and UI. For example, in some implementations, abandonment machine profile editor 302 may generate an abandoned machine profile by presenting a UI during configuration and receiving user input defining the set of one or more machines for abandonment (e.g., via drag-and-drop from a list of machines monitored by the network traffic monitor 142) and a traffic definition.

In some implementations, the abandoned machine profile editor 302 may at least partially generate an abandoned machine profile using machine learning. In some implementations, the abandoned machine profile editor 302 may train, validate, and test a machine learning model to classify a set of machines associated with an entity so that each class of machine may be associated with its own abandoned machine profile. For example, the abandoned machine profile editor 302 may automatically generate a profile associated with a set of machines used exclusively by a team of developers and populate the machine identifiers associated with that set of one or more machines to monitor for abandonment in association with that profile. As another example, the abandoned machine profile editor 302 may identify a set of machines that are frequently, or have historically, been abandoned and automatically generate a profile associated with that set of machines. In some implementations, the abandoned machine profile editor 302 may train, validate, and test a machine learning model to determine one or more of the characteristics of an abandoned and/or of an unabandoned machine and populate the traffic definition based on that model. For example, in some implementations, the traffic definition may include the model as the whole or partial definition. As another example, in some implementations, the model may modify the characteristics or sub-characteristics used in the traffic definition (e.g., modify a weight assigned to each characteristic, modify a threshold of what a "small" amount of data means, add or remove a port from a port list, etc.).

The abandoned machine profile editor 302 may train one or more abandoned machine identification models using a variety of machine learning techniques, depending on the implementation and use case, including supervised learning, unsupervised learning, semi-supervised learning, etc. The varieties of supervised, semi-supervised, and unsupervised machine learning algorithms that may be used, by the abandoned machine profile editor 302, to train the one or more abandoned machine identification models are so numerous as to defy a complete list. Example algorithms include, but are not limited to, a decision tree; a gradient boosted tree; boosted stumps; a random forest; a support vector machine; a neural network; a recurrent neural network; a recurrent neural network; deep learning; long short-term memory; transformer; logistic regression (with regularization), linear regression (with regularization); stacking; a Markov model; Markov chain; support vector machines; and others. In some implementations, the abandoned machine identification model may include a binary classifier to label a machine as abandoned or not abandoned.

The training, training data, validation, and validation data may vary depending on the implementation. In some implementations, the abandoned machines profile editor 302 may be retrained based on user input. For example, when a user selects to manually deactivate a machine identified by the system and methods herein as abandoned, that may be used to retrain, or through reinforced learning, to improve the accuracy of the model.

In some implementations, abandoned machine profile editor 302 passes the abandoned machine profile(s) to one or more of the network telemetry data obtainer 304, the active machine identifier 306, and the telemetry analyzer 308. In some implementations, the abandoned machine profile editor 302 stores the abandoned machine profile(s) in memory 204 (or any other non-transitory storage medium communicatively accessible), and the other modules of the abandoned machines identifier 220 (e.g., one or more of the network telemetry data obtainer 304, the active machine identifier 306, and the telemetry analyzer 308) may retrieve the abandoned machine profile(s) from the memory 204 (or other non-transitory storage medium).

The network telemetry data obtainer 304 includes code and routines for obtaining network telemetry data. In one implementation, the network telemetry data obtainer 304 is a set of instructions executable by the processor 202. In another implementation, the network telemetry data obtainer 304 is stored in the memory 204 and is accessible and executable by the processor 202. In either implementation, the network telemetry data obtainer 304 is adapted for cooperation and communication with the processor 202, other components of the server 122 and other components of the abandoned machine identifier 220.

The network telemetry data obtainer 304 obtains network telemetry data. In one implementation, the network telemetry data obtainer 304 obtains network telemetry data from, or stored by, the network traffic monitor 142. In some implementations, the network traffic monitor 142 may include Progress Software Corporation's Flowmon®; however, Flowmon® is merely one example of a network traffic monitor 142 and others exist and may be used. For example, in some implementations, the abandoned machines IDer 220 is network traffic monitor 142 agnostic.

Depending on the implementation and use case the network telemetry data obtained by the network telemetry data obtainer 304 may vary in the content of what the obtained network telemetry data represents and/or the format in which the network telemetry data is stored. In some implementations, the network telemetry data obtainer 304 may obtain only a subset of network telemetry data available to the network telemetry data obtainer 304. For example, in some implementations, the network telemetry data obtainer 304 may obtain a subset of network telemetry data based on one or more profiles (e.g., only network telemetry data describing network traffic associated with a particular set of machines associated with that profile and/or relating to the traffic definition, such as relating to a particular port). In some cases, different network traffic monitors 142 may monitor different aspects of network traffic and/or the same aspects differently, and, in some implementations, the network telemetry data obtainer 304 is network traffic monitor 142 agnostic and/or configurable to obtain the relevant network telemetry data (i.e., the network telemetry data used by the other components of the abandoned machines identifier 220, as described below) from different network traffic monitors 142. In some implementations, the network traffic monitor 142 represents Progress Software Corporation's Flowmon®. Depending on the implementation and use case, the network telemetry data may vary in format. Examples of network telemetry data formats may include, but are not limited to, one or more of netflow, ipfix, jflow, vpc flow logs, sflow, etc. In some implementations, the network telemetry data obtainer 304 may obtain the telemetry data and determine a common representation (e.g., convert and store the telemetry data in a single, common format).

In one implementation, the network telemetry data obtainer 304 passes the telemetry data to one or more modules of the abandoned machines identifier 220 (e.g., the active machine identifier 306 and/or the telemetry analyzer 308). In one implementation, the network telemetry data obtainer 304 stores the telemetry data in memory 204 (or any other non-transitory storage medium communicatively accessible). The other modules of the abandoned machines identifier 220 may retrieve the telemetry data from the memory 204 (or other non-transitory storage medium).

The active machine identifier 306 determines a set of active machines. In some implementations, the active machine identifier 306 identifies the set of machines to be monitored (e.g., an IP subnet from an abandoned machine profile), determines which of those machines are active (e.g., based on telemetry data accessible via the network telemetry obtainer 304), and generates an active machine list. Depending on the implementation and use case, the set of active machines may include active-but-abandoned machines, active-but-unabandoned machines, or a combination thereof.

In one implementation, the active machine identifier 306 passes the set of active machines to the telemetry analyzer 308. In one implementation, the active machine identifier 306 stores the set of active machines in memory 204 (or any other non-transitory storage medium communicatively accessible). The other modules of the abandoned machine identifier 220 including, e.g., the telemetry analyzer 308, may retrieve the set of active machines by accessing the memory 204 (or other non-transitory storage medium).

The telemetry analyzer 308 includes code and routines for determining which active machines are abandoned or unabandoned depending on the implementation. In one implementation, the telemetry analyzer 308 is a set of instructions executable by the processor 202. In another implementation, the telemetry analyzer 308 is stored in the memory 204 and is accessible and executable by the processor 202. In either implementation, the telemetry analyzer 308 is adapted for cooperation and communication with the processor 202, other components of the computing device 106/122 (e.g., the network traffic monitor 142) and other components of the abandoned machines identifier 220.

In some implementations, the telemetry analyzer 308 identifies which machines are abandoned based on whether the network telemetry data describing network traffic associated with a machine is characteristic or uncharacteristic of human machine use. In some implementations, the telemetry analyzer 308 applies a traffic definition, e.g., from an abandoned machines profile, to determine whether network telemetry data associated with an active machine is characteristic of human use, automated use, or both, and thereby determine whether a monitored and active machine is abandoned or in-use.

In some implementations, the telemetry analyzer 308 passes identification of the abandoned machine(s) to one or more of the reporting engine 310 and the abandoned machines deactivator 312. In one implementation, the telemetry analyzer 308 stores the identification of the abandoned machine(s) in memory 204 (or any other non-transitory storage medium communicatively accessible). The other modules of the abandoned machines identifier 220 including, e.g., the reporting engine 310 and/or the abandoned machines deactivator 312, may retrieve the identification of the abandoned machine(s) by accessing the memory 204 (or other non-transitory storage medium).

The reporting engine 310 includes code and routines for generating and presenting a report. In one implementation, the reporting engine 310 is a set of instructions executable by the processor 202. In another implementation, the reporting engine 310 is stored in the memory 204 and is accessible and executable by the processor 202. In either implementation, the reporting engine 310 is adapted for cooperation and communication with the processor 202, other components of the server 122 and other components of the abandoned machines identifier 220.

In one implementation, reporting engine 310 generates and presents a report. In some implementations, the report identifies the one or more active, but abandoned machines. For example, the report provides a list of machine identifiers, such as IP and/or MAC addresses, associated with each abandoned machine. In some implementations, the presentation may include presentation to a human (e.g., a system administrator) for review. In some implementations, the presentation may include presentation to the abandoned machine deactivator 312 for deactivation of those machines identified as abandoned, whether automatically or subject to human review and approval.

In some implementations, the reporting engine 310 may obtain, provide, and track supplemental information. For example, when machine 132a is determined to be abandoned, the reporting engine 310 may obtain and provide supplemental information describing one or more of when machine 132a was deployed, what user initiated the machine's deployment, when the machine 132a was last used, which user was the last to use machine 132a, a user group associated with the last user, a user group associated with the user that initiated the machine's deployment, etc. Such information may be useful to identify users or user groups that may benefit from education or intervention due to patterns of abandonment (e.g., frequent abandonment). It should be recognized that the preceding are merely examples of supplemental information and others exist, are contemplated, and may be used without departing from this disclosure.

In some implementations, the abandoned machines identifier 220 may omit an abandoned machine deactivator 312. For example, once the abandoned machines identifier 220 identifies and presents the one or more abandoned machines, it is up to a user 112 to act (e.g., to deactivate a machine identified as abandoned). In some implementations, the deactivation actions and/or mechanism may be outside the scope of the abandoned machines identifier 220, e.g., the user physically manipulates a power switch on an abandoned machine, or using a separate mechanism, application, or interface to deactivate the abandoned machine. In some implementations, deactivations or a subset of deactivations may be performed by the abandoned machine deactivator 312 of an abandoned machines identifier 220.

In some implementations, the reporting engine 310 passes the report to the abandoned machine deactivator 312. For example, the reporting engine 310 is communicatively coupled to the abandoned machine deactivator 312 to send the report. In some implementations, the reporting engine 310 stores the report in memory 204 (or any other non-transitory storage medium communicatively accessible), and the abandoned machine deactivator 312 may retrieve the report by accessing the memory 204 (or other non-transitory storage medium).

The abandoned machine deactivator 312 includes code and routines for deactivating one or more machines. In some implementations, the abandoned machine deactivator 312 is a set of instructions executable by the processor 202. In another implementation, the abandoned machine deactivator 312 is stored in the memory 204 and is accessible and executable by the processor 202. In either implementation, the abandoned machine deactivator 312 is adapted for cooperation and communication with the processor 202, other components of the computing device 106/122 and other components of the abandoned machines identifier 220.

Depending on the implementation and use case, the abandoned machine deactivator 312 may deactivate abandoned machines with different levels of autonomy. For example, in some implementations, the deactivation by the abandoned machine deactivator 312 is manual. For example, the abandoned machine deactivator 312 requires receipt of user input (e.g., user input explicitly instructing the abandoned machine deactivator 312 to deactivate a machine identified as abandoned) before deactivating a machine identified as abandoned and does not automatically deactivate an identified, abandoned machine without that user input/authorization. In some implementations, the deactivation performed by the abandoned machine deactivator 312 is automatic. For example, the abandoned machine deactivator 312 automatically deactivates a machine identified as abandoned responsive to identification of the machine as abandoned by the telemetry analyzer 308.

In some implementations, one or more of whether a report is generated, the format and/or content of a report, whether the abandoned machine(s) is deactivated manually or automatically may be specified in the abandoned machines profile via the abandoned machine profile editor. This may allow granular control of the definition of "abandoned" and treatment of machines identified as "abandoned" for different sets of machines. For example, a more inclusive definition of abandonment and auto-deactivation may be desired for internal environments to reduce costs (e.g., to rapidly deactivate machines abandoned by a company's development team), while a less inclusive definition and manual deactivation may be desired for machines that host applications used by customers to reduce the risk of a negative impacts on those customers.

Example Methods

Figure 4:
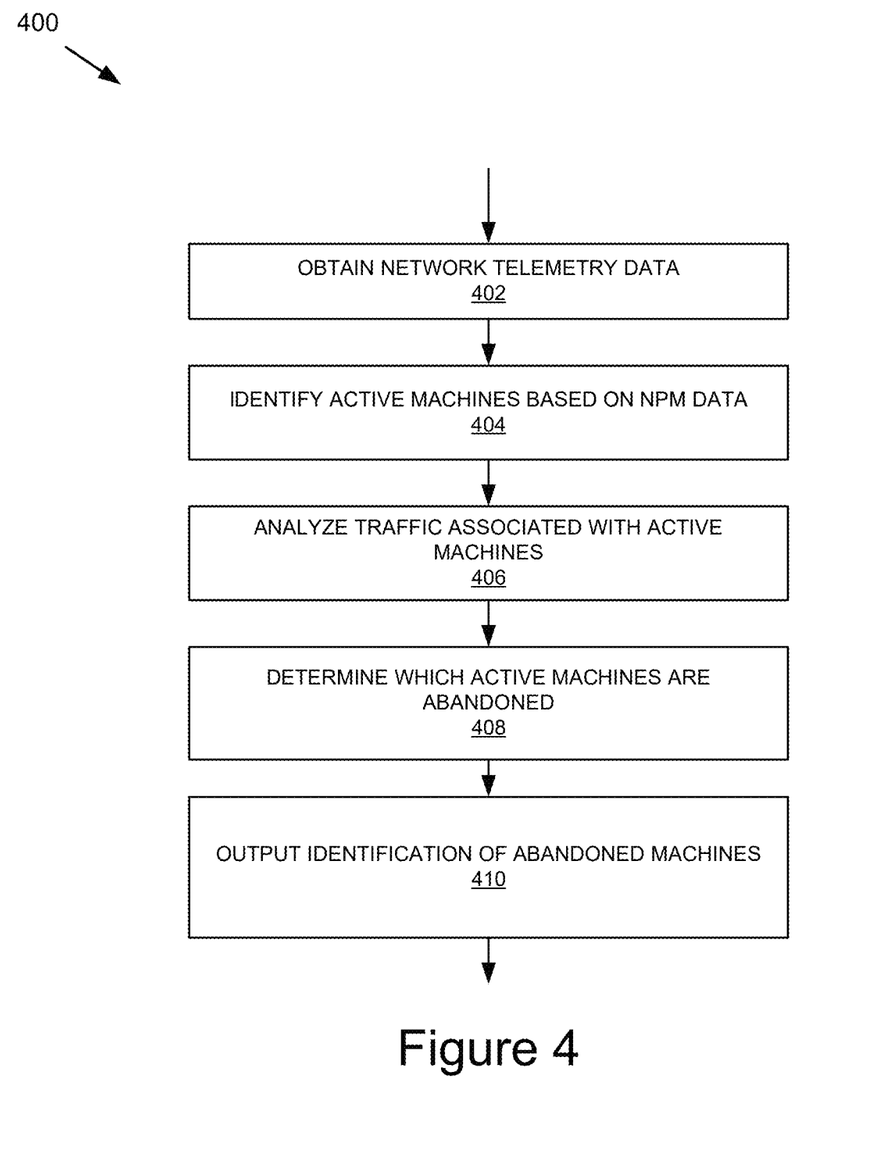
FIG. 4 is a flowchart of an example method for identifying one or more abandoned machines in accordance with some implementations.

FIG. 4 depicts method 400 performed by the system described above in reference to FIGS. 1-3. The method 400 begins at block 402. At block 402, the network telemetry data obtainer 304 obtains network telemetry data. At block 404, the active machine identifier 306 identifies one or more active machines based on network telemetry data. At block 406, the telemetry analyzer 308 analyzes the network telemetry data associated with active machines. At block 408, the telemetry analyzer 308 determines which active machines are abandoned. At block 410, the reporting engine 310 outputs an identification of the one or more abandoned machines.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" means that a particular feature, structure, or characteristic described in connection with the implementation is included in at least one implementation. The appearances of the phrase "in one implementation" in various places in the specification are not necessarily all referring to the same implementation.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
   obtaining, using one or more processors, network telemetry data;
   identifying, using the one or more processors, a set of active machines based on network telemetry data;
   obtaining, using one or more processors, a first abandoned machine profile associated with a first active machine within the set of active machines, the first abandoned machine profile specific to a defined first subset of machines that includes the first active machine;
   obtaining, using one or more processors, a second abandoned machine profile associated with a second active machine within the set of active machines, the second abandoned machine profile specific to a defined second subset of machines that includes the second active machine;

analyzing, using the one or more processors, a first subset of the network telemetry data associated with the first active machine based on the first abandoned machine profile;

analyzing, using the one or more processors, a second subset of the network telemetry data associated with the second active machine based on the second abandoned machine profile;

determining, using the one or more processors, one or more of the first active machine is an abandoned machine based on the first abandoned machine profile and the second active machine is an abandoned machine based on the second abandoned machine profile; and outputting, using the one or more processors, an identification of the one or more abandoned machines.

2. The method of claim 1 further comprising:

generating a set of machines to monitor for abandonment based on a set of machines known to a network traffic monitor, and wherein the network telemetry data obtained is a subset of available network telemetry data available and is that network telemetry data that is associated with the set of machines to monitor for abandonment.

3. The method of claim 1 further comprising:

determining a set of monitored machines, the set of monitored machines being monitored by a network traffic monitor that generates the network telemetry data, and the set of monitored machines is further being monitored for abandonment, wherein the network telemetry data obtained describes the set of one or more monitored machines and includes the set of active machines.

4. The method of claim 3, wherein the set of monitored machines is identified by an identifier in the network telemetry data, wherein the identifier includes one or more of a range of a MAC addresses, a range of IP addresses, a list of MAC addresses, a list of IP addresses, a universal unique identifier of a virtual machine, and an interface ID of network adapter.

5. The method of claim 1, wherein analyzing the network telemetry data associated with the set of active machines determining whether the network telemetry data includes one or more of a first characteristic associated with an active but unabandoned machine and a second characteristic associated with an abandoned machine.

6. The method of claim 5, wherein the second characteristic associated with an abandoned machine is associated with one or more of a port number associated with traffic and a periodicity of the traffic, the traffic described by the network telemetry data.

7. The method of claim 1, wherein determining the one or more abandoned machines in the set of active machines includes:

analyzing the network telemetry data;

determining that the network telemetry data associated with a first machine is uncharacteristic of human use; and identifying the first machine as one of the one or more abandoned machines.

8. The method of claim 1, wherein the set of active machines includes one or more of a virtual machine and a physical machine.

9. The method of claim 1 further comprising:

deactivating a first abandoned machine in the one or more identified, abandoned machines, wherein the deactivation is one of:

automatic and based on the identification of the first abandoned machine as abandoned, or based on the identification of the first abandoned machine as abandoned and responsive to user input requesting abandonment.

10. The method of claim 1, wherein the identification of the one or more abandoned machines is output in a report presented to a user.

11. The method of claim 1, wherein the defined first subset of machines is associated with a class of machines automatically determined and associated with the first abandoned machine profile.

12. The method of claim 1, wherein the first subset of machines and the second subset of machines are associate with one or more of a different user set and a different environment.

13. A system comprising:

one or more processors; and a memory storing instructions that, when executed by the one or more processors, cause the system to:

obtain network telemetry data;

identify a set of active machines based on network telemetry data;

obtaining a first abandoned machine profile associated with a first active machine within the set of active machines, the first abandoned machine profile specific to a defined first subset of machines that includes the first active machine;

obtaining a second abandoned machine profile associated with a second active machine within the set of active machines, the second abandoned machine profile specific to a defined second subset of machines that includes the second active machine;

analyze a first subset of the network telemetry data associated with the first active machine based on the first abandoned machine profile;

analyze a second subset of the network telemetry data associated with the second active machine based on the second abandoned machine profile;

determine one or more of the first active machine is an abandoned machine based on the first abandoned machine profile and the second active machine is an abandoned machine based on the second abandoned machine profile; and output an identification of the one or more abandoned machines.

14. The system of claim 13 comprising instructions that, when executed, cause the system to:

generate a set of machines to monitor for abandonment based on a set of machines known to a network traffic monitor, and wherein the network telemetry data obtained is a subset of available network telemetry data available and is that network telemetry data that is associated with the set of machines to monitor for abandonment.

15. The system of claim 13 comprising instructions that, when executed, cause the system to:

determine a set of monitored machines, the set of monitored machines being monitored by a network traffic monitor that generates the network telemetry data, and the set of monitored machines is further being monitored for abandonment, wherein the network telemetry data obtained describes the set of one or more monitored machines and includes the set of active machines.

16. The system of claim 15, wherein the set of monitored machines is identified by an identifier in the network telemetry data, wherein the identifier includes one or more of a range of a MAC addresses, a range of IP addresses, a list of MAC addresses, a list of IP addresses, a universal unique identifier of a virtual machine, and an interface ID of network adapter.

17. The system of claim 13, wherein analyzing the network telemetry data associated with the set of active machines determining whether the network telemetry data includes one or more of a first characteristic associated with an active but unabandoned machine and a second characteristic associated with an abandoned machine.

18. The system of claim 17, wherein the second characteristic associated with an abandoned machine is associated with one or more of a port number associated with traffic and a periodicity of the traffic, the traffic described by the network telemetry data.

19. The system of claim 13, wherein determining the one or more abandoned machines in the set of active machines includes:
    analyzing the network telemetry data; and
    determining that the network telemetry data associated with a first machine is uncharacteristic of human use; and
    identifying the first machine as one of the one or more abandoned machines.

20. The system of claim 13 comprising instructions that, when executed, cause the system to:
    deactivate a first abandoned machine in the one or more identified, abandoned machines, wherein the deactivation is one of:
        automatic and based on the identification of the first abandoned machine as abandoned, or
        based on the identification of the first abandoned machine as abandoned and responsive to user input requesting abandonment.

* * * * *